H. CLIFFORD.
VEHICLE WHEEL.
APPLICATION FILED APR. 20, 1907.

898,436.

Patented Sept. 15, 1908.

Witnesses
C. J. Reed.
C. L. Reed

Herbert Clifford
Inventor
by Seymour & Earle
attys

THE NORRIS PETERS CO., WASHINGTON, D. C.

UNITED STATES PATENT OFFICE.

HERBERT CLIFFORD, OF NEW LONDON, CONNECTICUT, ASSIGNOR TO RALPH CLIFFORD, OF MONSON, MASSACHUSETTS.

VEHICLE-WHEEL.

No. 898,436. Specification of Letters Patent. Patented Sept. 15, 1908.

Application filed April 20, 1907. Serial No. 369,353.

*To all whom it may concern:*

Be it known that I, HERBERT CLIFFORD, a citizen of the United States, residing at New London, in the county of New London and State of Connecticut, have invented a new and useful Improvement in Vehicle-Wheels; and I do hereby declare the following, when taken in connection with the accompanying drawings and the letters of reference marked thereon, to be a full, clear, and exact description of the same, and which said drawings constitute part of this specification, and represent, in—

Figures 1, 2, 3, 4, 7:
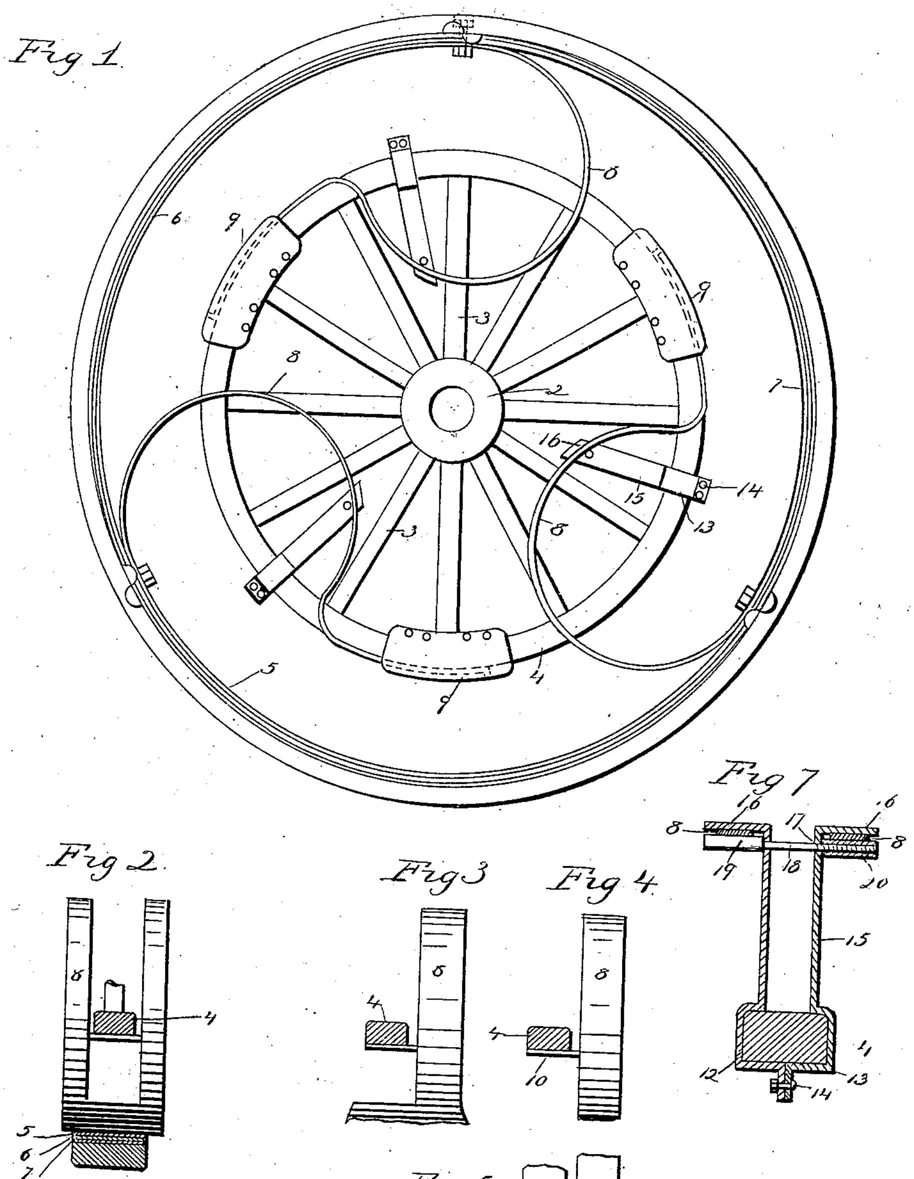
Figure 5:
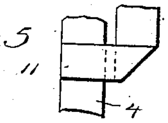
Figure 6:
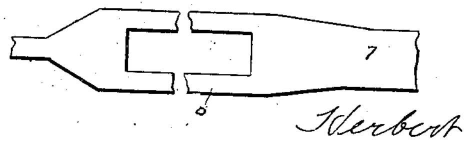

Figure 1 a side view of a wheel constructed in accordance with my invention. Fig. 2 a broken sectional view showing the spring slotted to clear the felly. Fig. 3 a broken sectional view showing the spring cut away at one side to clear the felly. Fig. 4 a broken sectional view showing the end of the spring offset for connection with the felly. Fig. 5 a broken plan view of one end of the spring showing its end bent at a right angle to the spring for engagement with the felly. Fig. 6 a broken plan view of the portion of the spring forming the bend. Fig. 7 a sectional view through one of the spring-retaining brackets.

This invention relates to an improvement in vehicle wheels, and while especially adapted for wheels in which the rim is made up of convolute springs, the ends of the springs being bent and connected with the felly, is applicable to wheels having springs between the rim and felly, the object of the invention being to construct a wheel which may have power of absorbing motion due to running over uneven places in the road, and in which the rigidity of the wheel may be adjusted; and the invention consists in the construction hereinafter described and particularly recited in the claims.

Preferably and as shown in Fig. 1 of the drawings, the wheel consists of a hub 2, spokes 3 and felly 4, and a rim formed from three strips of spring metal 5, 6 and 7, these strips preferably overlapping each other and formed with bands 8 which extend from the rim inward overlapping the felly 4 to the face of which they are secured by clips 9 or otherwise. In my preferred form, the bent portions of these springs are wider than the width of the rim and felly and are slotted in the center to form a clearance for the felly; but instead of cutting out the central portion as shown in Fig. 2 of the drawings, a portion of the spring at one side may be cut away as shown in Fig. 3 of the drawings; or the springs may be arranged at one side of the plane of the felly and formed with an offset end 10 as shown in Fig. 4 of the drawings, and this end may be formed by bending the inner end 11 of the spring inward at a right angle to the main portion of the spring as shown in Fig. 5 of the drawings; so that it will be apparent that the form of the spring may be varied, it only being essential that it shall extend inward beyond the felly so as to give a long bend and thus greater flexibility. With flexible springs as thus described, it will be desirable to provide brackets by which the flexibility of the spring may be adjusted; and for this purpose I form brackets of two members 12 and 13 adapted to surround the felly and be secured outside the felly by bolts 14. These brackets are set inward over the edge of the felly and have arms 15 which extend inward and flanges or fingers 16 which project outward and overlap the portion of the spring extending inside the felly. These fingers limit the inward movement of the springs, and to limit the outward movement I form the arms 15 with perforations 17 through which a blot 18 passes, these bolts having long heads 19 which extend beneath the springs 8 on one side and long nuts 20 which are turned onto the ends of the bolt and stand beneath a portion of the spring on the opposite side of the felly, the head and nut of the bolt holding the spring rigid with the felly. These brackets can be moved on the felly toward or from the clips 9 so as to adjust the flexibility of the springs.

I claim:—

1. A vehicle wheel comprising a hub, spokes and felly, and a rim formed from convolute springs the ends of which are bent inward beyond said felly to which the ends of the springs are secured, substantially as described.

2. A vehicle wheel comprising a hub, spokes and felly, a rim, springs extending from said rim beyond said felly to which the ends of the springs are attached, a portion of the springs cut away to clear the felly.

3. A vehicle wheel comprising a hub, spokes and felly, a rim, springs extending from said rim beyond said felly to which the ends of the springs are attached, an opening in the spring to clear the felly.

4. A vehicle wheel comprising a hub, spokes and felly, a rim, springs extending from said rim inside of said felly, the ends of the springs secured thereto, and brackets connected with said felly and engaging said springs, substantially as described.

5. A vehicle wheel comprising a hub, spokes and felly, a rim, springs extending from said rim inside of said felly, the ends of the springs secured thereto, and brackets formed in two members adapted to surround said felly and formed with arms, and fingers extending over said springs, substantially as described.

6. A vehicle wheel comprising a hub, spokes and felly, a rim, springs extending from said rim inside of said felly, the ends of the springs secured thereto, brackets formed in two members adapted to surround said felly and formed with arms and fingers extending over said springs, and bolts passed through said arms beneath said springs, substantially as described.

In testimony whereof, I have signed this specification in the presence of two subscribing witnesses.

HERBERT CLIFFORD.

Witnesses:
F. N. SHOOK
J. E. SHOOK.